(12) United States Patent
Baker

(10) Patent No.: US 7,194,367 B2
(45) Date of Patent: Mar. 20, 2007

(54) METHOD AND SYSTEM FOR VERIFICATION, CALIBRATION AND SIMULATION OF A FUEL CELL TEST STATION

(75) Inventor: Marek Baker, Burnaby (CA)

(73) Assignee: Greenlight Power Technologies, Inc., Burnaby (CA)

( * ) Notice: Subject to any disclaimer, the term of this patent is extended or adjusted under 35 U.S.C. 154(b) by 651 days.

(21) Appl. No.: 10/439,308

(22) Filed: May 16, 2003

(65) Prior Publication Data

US 2004/0005486 A1  Jan. 8, 2004

Related U.S. Application Data

(60) Provisional application No. 60/381,059, filed on May 17, 2002.

(51) Int. Cl.
*G06F 19/00* (2006.01)

(52) U.S. Cl. .......................... 702/85; 429/17; 702/100

(58) Field of Classification Search .................. 702/63, 702/85, 98, 99, 100, 104, 108, 113, 182; 73/61.41, 61.76; 429/3, 17, 22, 33–34, 42, 429/78, 19; 324/434
See application file for complete search history.

(56) References Cited

U.S. PATENT DOCUMENTS

| 4,304,823 | A |  | 12/1981 | Lemelson |  |
|---|---|---|---|---|---|
| 5,170,124 | A |  | 12/1992 | Blair et al. |  |
| 5,401,589 | A |  | 3/1995 | Palmer et al. |  |
| 6,322,917 | B1 | * | 11/2001 | Acker | 429/17 |
| 6,698,278 | B2 | * | 3/2004 | Zhang et al. | 73/61.76 |
| 6,889,147 | B2 | * | 5/2005 | Gopal et al. | 702/63 |
| 2003/0138688 | A1 |  | 7/2003 | Hattori et al. |  |

FOREIGN PATENT DOCUMENTS

| EP | 1 132 986 | 9/2001 |
|---|---|---|
| WO | WO 02/18785 | 3/2002 |
| WO | WO 02/27342 | 4/2002 |
| WO | WO 03/071617 | 8/2003 |

* cited by examiner

*Primary Examiner*—Bryan Bui
*Assistant Examiner*—John Le
(74) *Attorney, Agent, or Firm*—Bereskin & Parr

(57) ABSTRACT

A method and system for calibrating a fuel cell test station. The fuel cell test station has an interface for connection to at least one of a fuel cell, a fuel cell stack and a fuel processor to measure a plurality of physical characteristics associated therewith to obtain a plurality of station measurements. The method and system involve: (a) concurrently measuring the plurality of physical characteristics to obtain a plurality of measurements; (b) storing the plurality of measurements; and, (c) comparing the plurality of measurements with the plurality of station measurements to obtain an aggregate calibration of the fuel cell test station.

17 Claims, 6 Drawing Sheets

METHOD AND SYSTEM FOR VERIFICATION, CALIBRATION AND SIMULATION OF A FUEL CELL TEST STATION

This application claims benefit of the provisional application 60/381,059 filed on May 17, 2002.

FIELD OF THE INVENTION

This application relates to a portable apparatus for verifying the accuracy and consistency of test data produced by fuel cell test stations and for simulating some of the physical characteristics of a fuel cell. The apparatus can be used to calibrate each test station to a pre-defined test standard, and to experiment with new test setups without fear of damaging an expensive fuel cell.

BACKGROUND OF THE INVENTION

Test stations are used by developers and manufacturers of fuel cell systems to test new designs and materials and to monitor product life cycles. Such test stations include numerous subsystems, such as gas mixing modules, humidification units, water management systems, load banks, measuring devices and system controllers. Test stations control the physical characteristics of the reactants and cooling fluid entering a fuel cell, to simulate the various conditions that a fuel cell would encounter during real world operation. Typically, all fuel cells require three material inputs to operate: a fuel, an oxidant and a cooling fluid. The fuel (typically hydrogen) and oxidant (typically air) are delivered to the fuel cell in the form of heated, and humidified gas. The gas temperature, pressure, flow rate and humidity are all controlled from the test station. The coolant (typically de-ionized water) is delivered to the fuel cell for thermal control. Controllable properties of the coolant include temperature, pressure, flow rate, and conductivity.

With the delivery of the following inputs, a fuel cell produces an electric potential across its terminals, from which current can be drawn. The test stations apply varying electrical loads, and measure the subsequent fuel cell voltage. Test stations may also include integrated data acquisition and reporting hardware and software for analyzing test results.

The data generated by test stations is relied upon by product development engineers to test assumptions and hypotheses, and to assist in making product design decisions. Accordingly, if the data generated by a test station is faulty, this may result in flawed design or production decisions having potentially serious and expensive consequences. It is therefore imperative that test station data be as accurate and reliable as possible.

Many fuel cell developers and manufacturers employ multiple fuel cell test stations located at different locations on site. Often such test stations are manufactured by different suppliers and comprise different combinations of testing equipment. However, despite their design differences, fuel cell test stations generally control and measure many of the same properties. Problems can arise if a product designer suspects that some of the test stations are not producing accurate and consistent results (and hence the data generated by different stations is not readily comparable). Prior to the present invention there was no way to verify that the instrumentation of each test station was calibrated to the same standard and hence it was difficult to compare and characterize fuel cell stacks tested at different stations. Previously, data output verification could only be performed on one type of device measuring one physical characteristic on one station. For example, if an operator suspected that a flow meter was faulty, it would be necessary to physically remove the flow meter from the test station and conduct bench tests to verify its accuracy. Alternatively, diverter valves would be required to isolate the instrument from the rest of the test station. In either case instrument verification and re-calibrations was a painstaking and time consuming exercise.

The present invention has been developed to provide an integrated testing apparatus for quickly verifying the accuracy of data outputted by fuel cell test stations. Additionally, the invention can be used to simulate the behavior of an actual fuel cell allowing for the development of fuel cell tests. This avoids risking a valuable fuel cell during test development. The apparatus is portable so that it may be conveniently transported between the different test station locations.

SUMMARY OF THE INVENTION

In accordance with aspects of the invention, a fuel cell test station verification, calibration and simulation apparatus is provided. The apparatus includes a plurality of inlets for connecting to the fuel cell stack or fuel processor interface of a test station. For example, the apparatus is connectable to the fuel supply, oxidant supply, nitrogen supply and coolant supply of the test station. The apparatus also includes a plurality of outlets, which are connectable to corresponding test station inlets, such as fuel, oxidant and coolant inputs. The apparatus comprises high quality, traceable instrumentation and a data acquisition and recording system. Depending upon the test results, data correction factors may be calculated for adjusting previously recorded test station data. The invention may also comprise a computer model of a simulated fuel cell and a means for changing the model's parameters.

An object of a first aspect of the present invention is to provide an improved fuel cell testing station verification, calibration and simulation system.

In accordance with this first aspect of the present invention there is provided a system for calibrating a fuel cell test station. The fuel cell test station has an interface for connection to at least one of a fuel cell, a fuel cell stack and a fuel processor to measure a plurality of physical characteristics associated therewith to obtain a plurality of station measurements. The system comprises: (a) a plurality of inlets for connecting to a plurality of interface outlets of the interface to receive a plurality of inflows therefrom; (b) a plurality of outlets for connecting to a plurality of interface inlets of the interface for discharging a plurality of outflows thereto; (c) a plurality of sensors associated with the plurality of inlets and plurality of outlets for measuring the plurality of physical characteristics of the plurality of inflows and the plurality of outflows to obtain a plurality of measurements for comparison with the plurality of station measurements; and, (d) a data processor for receiving and storing the plurality of measurements from the plurality of sensors and for comparing the plurality of measurements with the plurality of station measurements, the data processor being connected to the plurality of sensors by data transfer means An object of a second aspect of the present invention is to provide an improved fuel cell testing station verification, calibration and simulation system.

In accordance with this second aspect of the present invention there is provided a method of calibrating a fuel cell test station. The fuel cell test station has an interface for connection to at least one of a fuel cell, a fuel cell stack and a fuel processor to measure a plurality of physical characteristics associated therewith to obtain a plurality of station measurements. The method comprises: (a) concurrently measuring the plurality of physical characteristics to obtain a plurality of measurements; (b) storing the plurality of measurements; and, (c) comparing the plurality of measurements with the plurality of station measurements to obtain an aggregate calibration of the fuel cell test station.

BRIEF DESCRIPTION OF THE DRAWINGS

In drawings which illustrates an embodiment of the invention but which should not be construed as restricting the spirit or scope of the invention in any way.

DETAILED DESCRIPTION OF THE INVENTION

Figure 1:
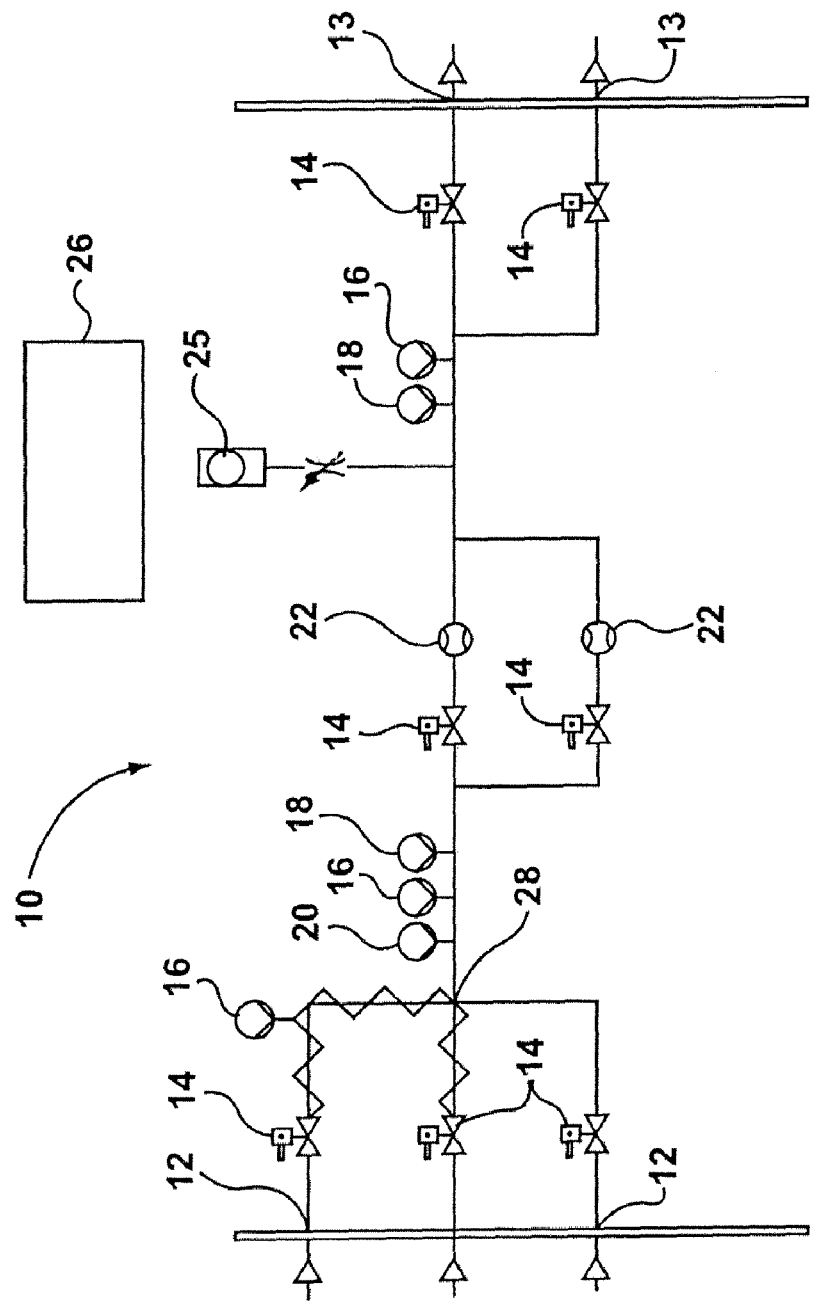
FIG. 1 is a piping and instrumentation diagram for a test station verification, calibration and simulation device according to one embodiment of the invention.
Figure 3:
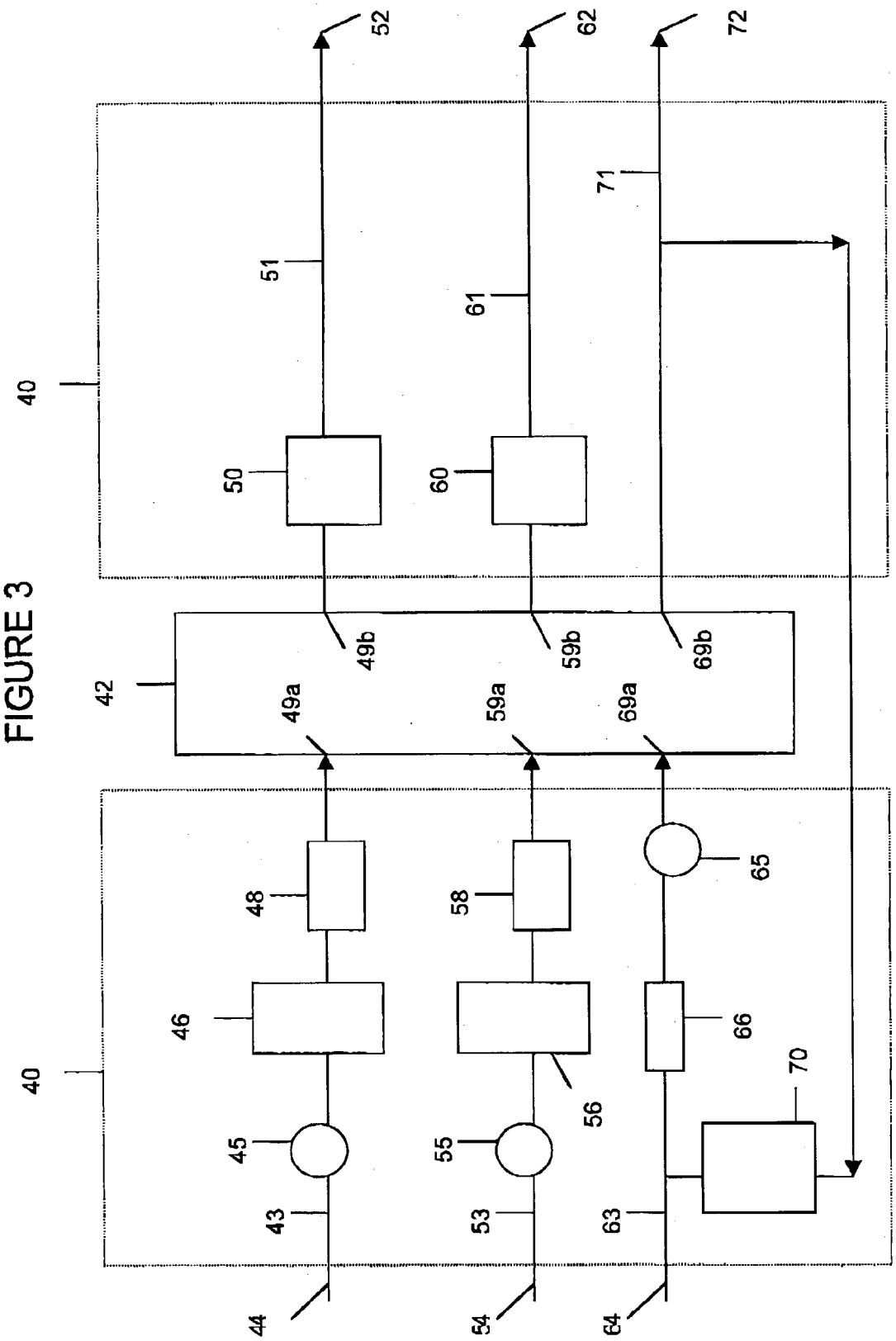
FIG. 3 is a schematic diagram of a test station providing a context for implementing different aspects of the invention.

As shown schematically in FIG. 1, this application relates to a test station verification, calibration and simulation apparatus 10. Apparatus 10 is connectable to the fuel cell stack interface of a test station 40 (FIG. 3). In particular, apparatus 10 comprises a plurality of inlets 12 for receiving fuel, oxidant, nitrogen and coolant supplies from the test station 40 and a plurality of outlets 13 for delivering precisely measured amounts of physical characteristics to the test station 40, such as fuel, oxidant, coolant and current inputs.

The apparatus 10 includes a plurality of high quality, traceable instrumentation for simultaneously or sequentially controlling, measuring and recording different physical characteristics. For example, as shown in FIG. 1, apparatus 10 may comprise manual or solenoid valves 14, thermocouples 16, pressure transducers 18, dew point meters 20, flow meters 22, and resistivity meters 24. Other physical parameter measuring devices may be provided, such as gas sample ports 25 and analyzers 26 (e.g. gas chromatographs). The various power inputs and outputs of a fuel cell are measured and controlled from the apparatus, as shown schematically in FIG. 2. As the reactant gases are provided to a fuel cell, a voltage is produced across the plates of each cell. This apparatus could provide a variable controlled DC power supply, connected to a resistor ladder to simulate the individual cell voltages of a fuel cell stack. An accurate current measuring device such as a shunt could be placed in the apparatus to test the current drawing calibration of the test station load box.

Power supplies for delivering precisely measured current or voltages to the test station may also be employed to simulate fuel cell stack voltages. On board heater hose 28 or other heaters are provided to heat gases or other reactants.

Preferably apparatus 10 includes computer hardware and software (FIG. 2) for recording a historical log of test data for each station including computer algorithms for calculating corrective factors if the test station data output is inaccurate. That is, the manual or solenoid valves 14, thermocouples 16, pressure transducers 18, dew point meters 20, flow meters 22, and resistivity meters 24 are all connected to the computer system of FIG. 2, such that at any time the readings received provide an overall "snap shot" of the state of the test station. The historical data can also be used to track degradation of test instrumentation and controls over time so that test instruments can be replaced or recalibrated when readings deviate from predetermined standards beyond an acceptable range. Computer algorithms may also be provided for diagnosing problems with the test station based on a pattern of errors received. If the accuracy quotient falls outside a tolerable range the test station could be replaced or removed from service for replacement of faulty instrumentation or controls.

Figure 2:
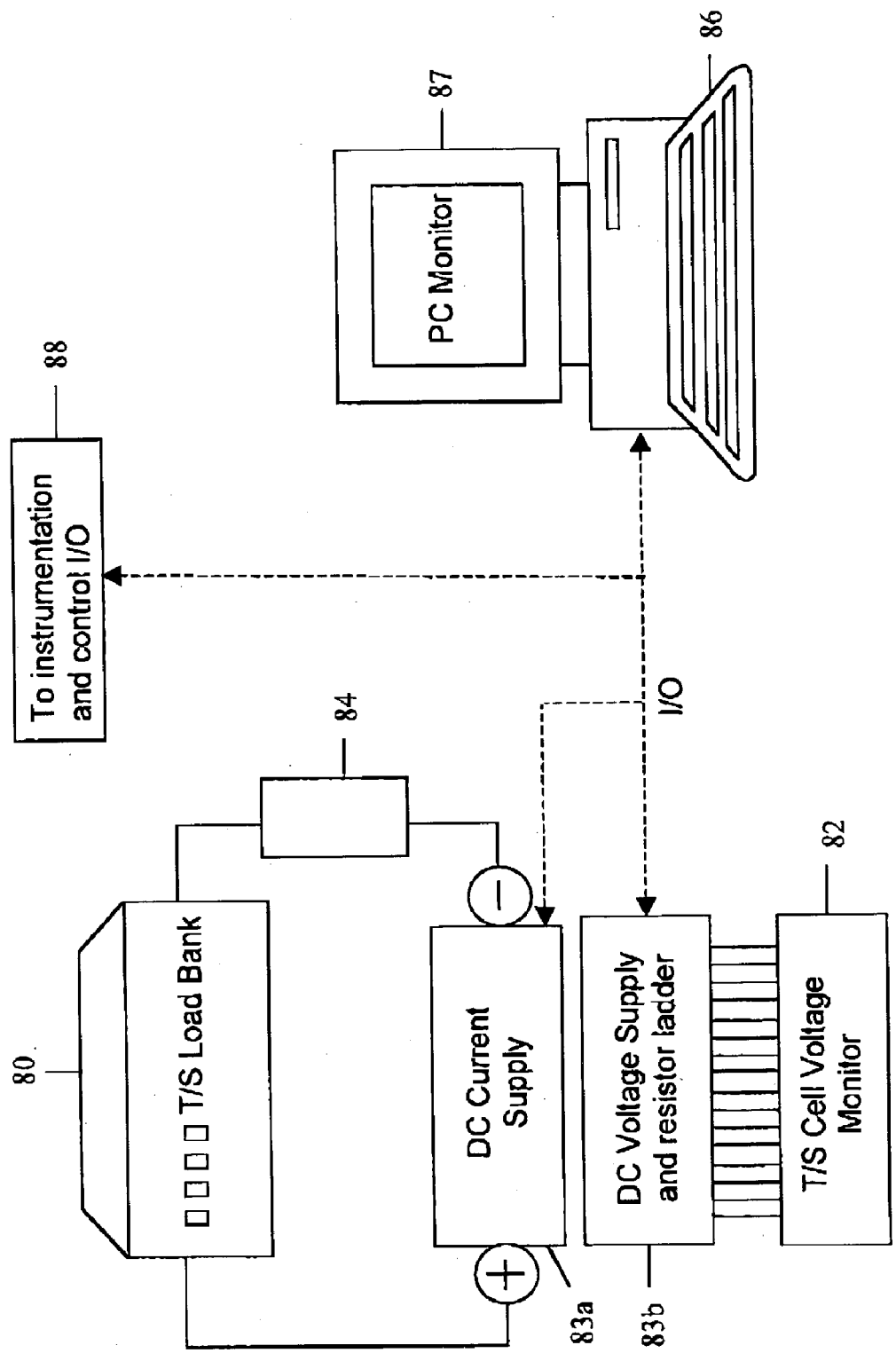
FIG. 2 is a schematic view showing a possible arrangement for the device of FIG. 1 (i.e. a Verification Test Cart (VTC)) adapted to interface with a fuel cell test station (i.e. Test Station (T/S))

Referring to FIG. 2, there is illustrated in a block diagram a computer system 78 linked to the apparatus 10 by I/O system 88 The computer system 78 includes a verification test cart (VTC) data acquisition control and analysis PC 86 having a PC monitor 87. The PC operates software, which controls the state of the apparatus 10 such that verification or fuel cell simulation can take place. During verification and calibration of the apparatus 10, the PC 86 logs pertinent data points and automatically calculates corrective calibration values required for a particular test station. This calibration data can then be stored for historical purposes, used in comparison with an established calibration baseline, or compared to similar data taken from other test stations. In fuel cell simulation mode, the PC controls the various apparatus outputs to physically simulate the response conditions of a programmed fuel cell computer model (a virtual fuel cell). Various models simulating different types of fuel cells can be stored and retrieved to run the test station through a number of different scenarios.

As described above, all sensors and control information in the apparatus 10 are connected to the PC monitor via VTC instrumentation and control I/O system, which relays data to the PC 86. Specifically, all of the instruments for controlling controllable physical characteristics of the flow, such as heaters, flow rate controllers, humidifiers and pressure controllers are connected to the I/O 88 to receive control inputs from the PC 86.

Most fuel cell stations contain a load bank, shown as T/S load bank 80 in FIG. 2. Typically, load banks are used to simulate an electrical load, such as an electric motor or the power supplied to a home. In effect, a load bank is a large variable resistor. Similarly, most fuel cell test stations include a cell voltage monitor (CVM) such as T/S CVM 82 as shown in FIG. 2. Such cell voltage monitors typically measure the voltage outputted from each cell of a fuel cell stack being tested. These elements of the test station are linked to elements of the computer system. Specifically, a DC current supply 83a provides a controllable DC current to verify the accuracy of the T/S load bank 80 or to calibrate the T/S load bank 80. In addition, the DC current supply 83a may also be controlled via I/O 88 from PC 86 to simulate an electrical current produced from a fuel cell.

Similarly, the DC voltage supply and resistor ladder 83b provides a controllable DC voltage supply that can be used to simulate the electric potential created by a fuel cell. This voltage can be passed through a resistor ladder to simulate the voltages of the individual cells in a fuel cell stack. As all fuel cell test stations measure cell voltages using a CVM, a controllable DC supply can be used to calibrate the test station CVM 82. Furthermore, the voltage supplied by the DC voltage supply 83b can be controlled and varied as part of a fuel cell stack simulation.

The computer system also includes a shunt 84. The shunt 84 is highly calibrated resistor, which can accurately measure current when placed in series with a current source. In the setup of FIG. 2, the T/S load bank 80 can use the shunt 84 to verify the accuracy and calibrate its load drawing capabilities.

In general, apparatus 10 employs very precise instrumentation to accurately measure the same physical characteristics as are commonly outputted from a test station. The test data can then be compared for calibration purposes, verification of control, and comparison to the calibration of another test station. Apparatus 10 makes it possible to easily calibrate each test station to a pre-defined test standard to ensure reliable and consistent test results. Apparatus 10 is preferably mounted on a mobile cart having caster wheels so that it may be easily transported between test sites.

Referring to FIG. 3, there is illustrated in a schematic diagram a test station 40 providing a suitable context in which to implement the present invention. As shown in FIG. 3, a fuel cell 42 may be linked to the test station for testing. Alternatively, the apparatus 10 may be linked to the test station 40 to test or calibrate the test station 40, or, alternatively, to simulate a fuel cell in a test run of the test station 40.

As shown in FIG. 3, the test station 40 comprises a fuel supply 44 for supplying fuel (hydrogen) to a fuel line 43. Fuel line 43 includes a fuel flow control valve 45 for controlling the flow of fuel, a humidifier 46 for providing a desired level of humidification to the fuel and a heater 48 for heating the fuel to a desired temperature. The fuel is then supplied to the fuel cell (or, alternatively, to a fuel inlet in the plurality of inlets of the apparatus 10) at a test station fuel outlet 49a. Fuel discharged from the fuel cell 42 (or, alternatively, discharged from the fuel outlet of the apparatus 10) is received in a fuel outlet line 51 at a test station fuel inlet 49b. The pressure of this fuel is measured by a fuel pressure sensor 50, before the fuel is discharged at fuel exhaust 52.

Similarly, oxidant is supplied to oxidant input line 53 by oxidant supply 54. The rate of flow of the oxidant (air) is controlled by oxidant flow controller 55. The humidity and temperature of the oxidant are controlled by oxidant humidifier 56 and oxidant heater 58 respectively before the oxidant input line 53 supplies the oxidant to the fuel cell at a test station oxidant outlet 59a. The fuel cell discharges the oxidant into oxidant outlet line 61 at a test station oxidant inlet 59b. The pressure of the oxidant is measured by pressure sensors 60 before the oxidant is discharged at oxidant exhaust 62. Similarly, coolant (water) is supplied to the coolant input line 63 by coolant supply 64. The temperature and rate of flow of the coolant are then controlled by heater 66 and coolant flow controller 65 respectively before the coolant is provided to the fuel cell 42 at a test station coolant outlet 69a. The coolant discharged from the fuel cell 42 is received by the coolant outlet line 71 at a test station coolant inlet 69b. A portion of the coolant in the coolant output line 71 is redirected to a coolant reservoir 70 which reconnects to the coolant inlet line 63 upstream from the heater 66 and coolant flow controller 65 The remainder of the coolant is discharged at the coolant drain 72.

According to another aspect of the invention, the behavior of an actual fuel cell can be simulated allowing for the development of fuel cell tests. This avoids risking a valuable fuel cell during test development. To this end, the invention may comprise a computer model of a simulated fuel cell as well as means for changing the model's parameter.

Figure 4:
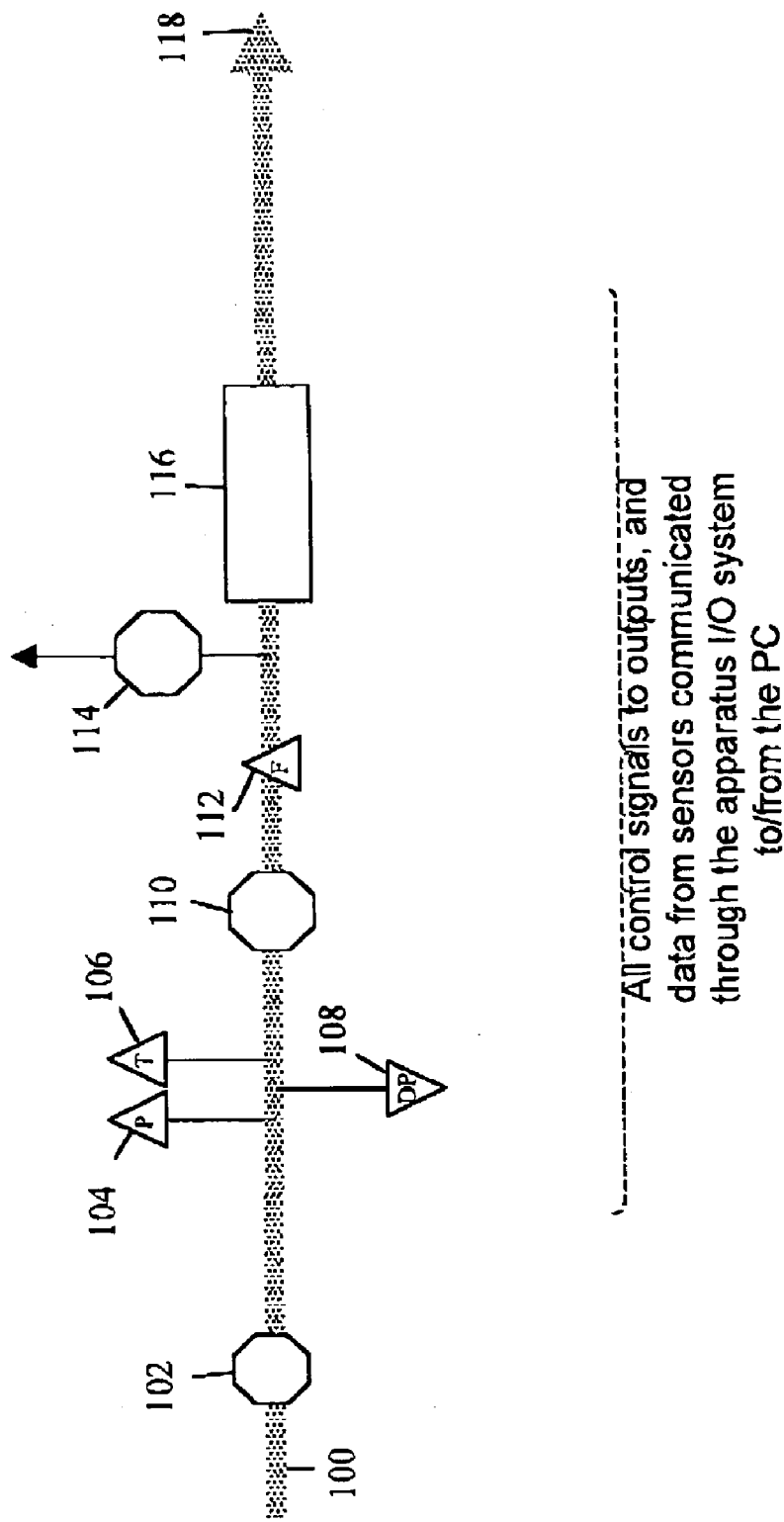
FIG. 4 is a schematic diagram of a fuel line of a test station verification, calibration and simulation device according to a second aspect of the invention.
Figure 5:
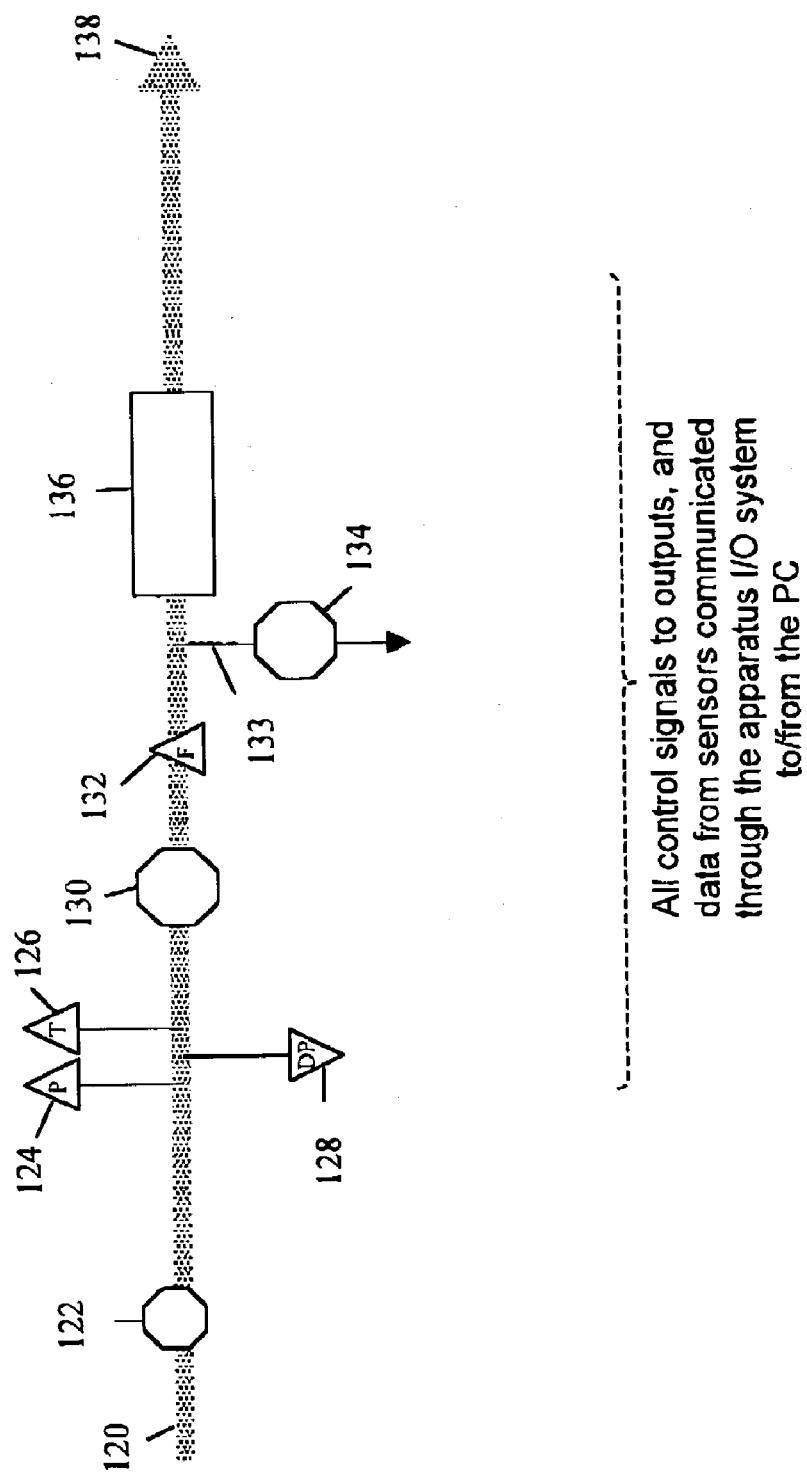
FIG. 5 is a schematic diagram of an oxidant line of the test station verification, calibration and simulation device of FIG. 4.
Figure 6:
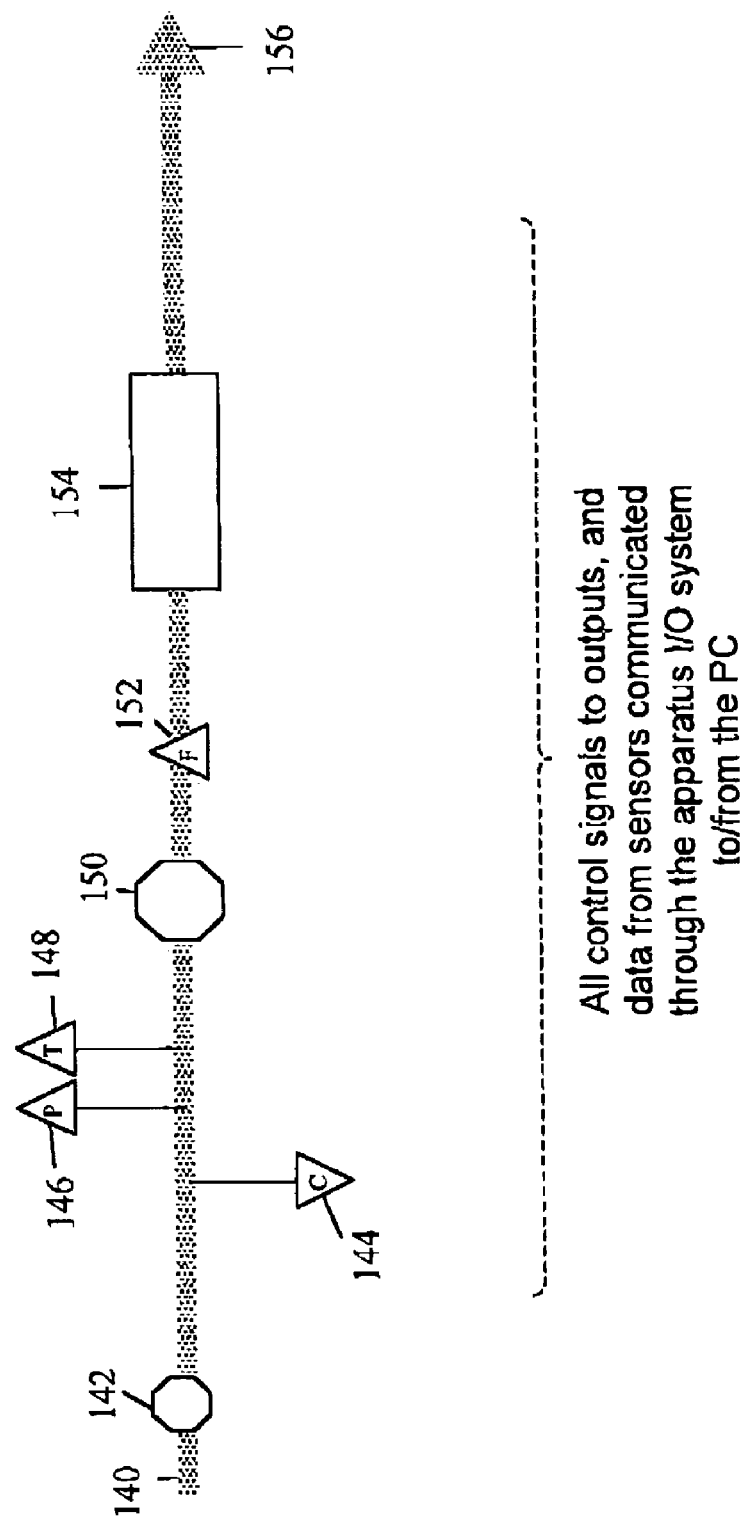
FIG. 6 is a schematic diagram of a coolant line of the test station verification, calibration and simulation device of FIG. 4

Referring to FIGS. 4, 5 and 6 there are illustrated in schematic diagrams a fuel supply line, an oxidant supply line and a coolant supply line respectively of a an apparatus in accordance with a further aspect of the invention. The fuel supply line receives fuel (hydrogen) from a fuel inlet 100. The fuel passes through an isolation valve 102, which, if desired, can be closed to shut off fuel flow, while permitting flow of oxidant and coolant. The pressure, temperature and humidity of the fuel are measured by pressure sensor 104, temperature sensor 106, and humidity sensor 108 respectively. The rate of flow of fuel is controlled by first flow control valve 110, and this rate of flow is then measured by flow meter 112. The first flow control valve 110 can be used to simulate varying pressure drops associated with different fuel cell architectures. This enables users of the test station to tune pressure control loops under different conditions without fear of damaging the fuel cell.

A bleed line 113 can be used to draw some of the fuel off from the fuel line. This is controlled by a second flow control valve 114, and is used to simulate the normal consumption of fuel by the chemical reaction within the fuel cell. Combined with the first control valve 110, this provides the feedback required to tune the pressure control loop of a test station. The bleed line 113 can also be connected to a gas chromatograph and used to verify the composition of the fuel.

A heater 116 is provided in the fuel line downstream from the branch where the bleed line 113 bleeds off fuel. This heater can be used to simulate the additional heat added to the system by the exothermal chemical reactions taking place within a fuel cell. Furthermore, the heater 116 can be used to prevent condensation from forming within the apparatus lines. Downstream from heater 116, the fuel is discharged to the test station at a fuel outlet 118.

Referring to FIG. 5, the oxidant supply line is illustrated. The oxidant supply line receives oxidant (air) from an oxidant inlet 120. The oxidant passes through an isolation valve 122, which, if desired, can be closed to shut off oxidant flow, while permitting flow of fuel and coolant. The pressure, temperature and humidity of the oxidant are measured by pressure sensor 124, temperature sensor 126, and humidity sensor 128 respectively. The rate of flow of oxidant is controlled by first flow control valve 130, and this rate of flow is then measured by flow meter 132. The first flow control valve 130 can be used to simulate varying pressure drops associated with different fuel cell architectures. This enables users of the test station to tune pressure control loops under different conditions without fear of damaging the fuel cell.

A bleed line 133 can be used to draw some of the oxidant off from the oxidant line. This is controlled by a second flow control valve 134, and is used to simulate the normal consumption of oxidant by the chemical reaction within the fuel cell. Combined with the first control valve 130, this provides the feedback required to tune the pressure control loop of a test station. The bleed line 133 can also be connected to a gas chromatograph and used to verify the composition of the oxidant.

A heater 136 is provided in the oxidant line downstream from the branch where the bleed line 113 bleeds off oxidant. This heater 136 can be used to simulate the additional heat added to the system by the exothermal chemical reactions taking place within a fuel cell. Furthermore, the heater 136 can be used to prevent condensation from forming within the apparatus lines. Downstream from heater 136, the oxidant is discharged to the test station at an oxidant outlet 138.

Referring to FIG. 6, the coolant supply line is illustrated. The coolant supply line receives coolant (water) from a coolant inlet 140. The coolant passes through an isolation valve 142, which, if desired, can be closed to shut off coolant flow, while permitting flow of fuel and oxidant. The pressure, temperature and conductivity of the coolant are measured by pressure sensor 146, temperature sensor 148, and conductivity sensor 144 respectively. The rate of flow of coolant is controlled by first flow control valve 150, and this rate of flow is then measured by flow meter 152. The first flow control valve 150 can be used to simulate varying pressure drops associated with different fuel cell architectures. This enables users of the test station to tune pressure control loops under different conditions without fear of damaging the fuel cell. A heater 154 is provided in the coolant line downstream from flow meter 152. This heater 154 can be used to simulate the additional heat added to the system by the exothermal chemical reactions taking place within a fuel cell. Downstream from heater 154, the coolant is discharged to the test station at a coolant outlet 156.

Other variations and modifications of the invention are possible. For example, to reduce the number of components required, thereby reducing the cost and weight of the apparatus, different lines may be combined into one line. That is, the line for the oxidant and fuel might be combined into one line, such that only one set of sensors and control devices is required for both the oxidant and fuel. Isolation valves upstream of this common line would be provided for both the fuel feeder line and the oxidant feeder line to shut off the flow of fuel, say, when the testing station was being calibrated relative to the physical characteristics of the oxidant. All such modifications or variations are believed to be within the sphere and scope of the invention as defined by the claims appended hereto.

The invention claimed is:

1. A system for calibrating a fuel cell test station, the fuel cell test station having an interface for connection to at least one of a fuel cell, a fuel cell stack and a fuel processor to measure a plurality of physical characteristics associated therewith to obtain a plurality of station measurements, the system comprising:
   (a) a plurality of inlets for connecting to a plurality of interface outlets of the interface to receive a plurality of inflows therefrom;
   (b) a plurality of outlets for connecting to a plurality of interface inlets of the interface for discharging a plurality of outflows thereto;
   (c) a plurality of sensors associated with the plurality of inlets and plurality of outlets for measuring the plurality of physical characteristics of the plurality of inflows and the plurality of outflows to obtain a plurality of measurements for comparison with the plurality of station measurements; and,
   (d) a data processor for receiving and storing the plurality of measurements from the plurality of sensors and for comparing the plurality of measurements with the plurality of station measurements, the data processor being connected to the plurality of sensors by data transfer means.

2. The system as defined in claim 1 wherein
   the plurality of outlets comprise a current supply means for supplying a current to the interface; and,
   the plurality of sensors comprise current control means for controlling the current and voltage control means for controlling a voltage of the current.

3. The system as defined in claim 1 further comprising a mobile platform for moving the system.

4. The system as defined in claim 3 wherein the mobile platform is a cart.

5. The system as defined in claim 1 wherein
   the plurality of inlets comprise a fuel inlet and a oxidant inlet;
   the plurality of outlets comprise a fuel outlet and a oxidant outlet;
   the plurality of physical characteristics comprises at least one fuel characteristic and at least one oxidant characteristic;
   the plurality of measurements comprises at least one fuel measurement and at least one oxidant measurement; and,
   the plurality of sensors comprises at least one fuel sensor for measuring the at least one fuel characteristic to provide the at least one fuel measurement and at least one oxidant sensor for measuring the at least one oxidant characteristic to provide the at least one oxidant measurement.

6. The system as defined in claim 5 wherein
   the at least one fuel sensor is selected from the group comprising a fuel temperature sensor, a fuel humidity sensor, a fuel flow rate sensor and a fuel pressure sensor; and,
   the at least one oxidant sensor is selected from the group comprising an oxidant temperature sensor, an oxidant humidity sensor, an oxidant flow rate sensor and an oxidant pressure sensor.

7. The system as defined in claim 6 wherein
   the plurality of inlets comprise a coolant inlet;
   the plurality of outlets comprise a coolant outlet in fluid communication with the coolant inlet;
   the plurality of physical characteristics comprises at least one coolant characteristic;
   the plurality of measurements comprises at least one coolant measurement; and,
   the plurality of sensors comprises at least one coolant sensor for measuring the at least one coolant characteristic to provide the at least one coolant measurement.

8. The system as defined in claim 7 wherein the at least one coolant sensor is selected from the group comprising a coolant temperature sensor, a coolant conductivity sensor, a coolant flow rate sensor and a coolant pressure sensor.

9. The system as defined in claim 1 further comprising a plurality of instruments for controlling a plurality of controllable characteristics of the plurality of outflows.

10. The system as defined in claim 9 wherein the data processor is connected to the plurality of instruments by the data transfer means and is operable to control the plurality of instruments to control the plurality of controllable characteristics of the plurality of outflows.

11. The system as defined in claim 10 wherein
the plurality of outlets comprise a fuel outlet and a oxidant outlet;
the plurality of controllable characteristics comprises at least one controllable fuel characteristic and at least one controllable oxidant characteristic; and,
the plurality of instruments comprises at least one fuel instrument for controlling the at least one controllable fuel characteristic and at least one oxidant instrument for controlling the at least one controllable oxidant characteristic.

12. The system as defined in claim 11 wherein
the at least one fuel instrument is selected from the group comprising a fuel heater, a fuel humidifier, a fuel flow controller and a fuel pressure controller; and,
the at least one oxidant instrument is selected from the group comprising an oxidant heater, an oxidant humidifier, an oxidant flow controller and an oxidant pressure controller.

13. The system as defined in claim 12 wherein
the plurality of outlets comprise a coolant outlet; and
the plurality of controllable characteristics comprises at least one controllable coolant characteristic.

14. The system as defined in claim 13 wherein the at least one coolant instrument is selected from the group comprising a coolant heater and a coolant flow controller.

15. A method of calibrating a fuel cell test station, the fuel cell test station having an interface for connection to at least one of a fuel cell, a fuel cell stack and a fuel processor to measure a plurality of physical characteristics associated therewith to obtain a plurality of station measurements, method comprising:
(a) receiving a plurality of inflows from a plurality of interface outlets of the interface;
(b) providing a plurality of outflows from a plurality of interface inlets of the interface;
(c) concurrently measuring the plurality of physical characteristics of the plurality of inflows and the plurality of outflows to obtain a plurality of measurements;
(d) storing the plurality of measurements; and,
(e) comparing the plurality of measurements with the plurality of station measurements to obtain an aggregate calibration of the fuel cell test station.

16. The method as defined in claim 15 further comprising controlling a plurality of controllable characteristics of the plurality of outflows to simulate a fuel cell.

17. The method as defined in claim 16 further comprising defining a virtual fuel cell on the data processor by specifying a plurality of values for the plurality of controllable characteristics of the plurality of outflows wherein the data processor is connected to the plurality of instruments by the data transfer means and is operable to control the plurality of instruments to control the plurality of controllable characteristics of the plurality of outflows.

* * * * *